United States Patent [19]

Ewert

[11] Patent Number: 5,086,828
[45] Date of Patent: Feb. 11, 1992

[54] LUNAR RADIATOR SHADE

[75] Inventor: Michael K. Ewert, Seabrook, Tex.

[73] Assignee: The United States of America as represented by the Administrator of the National Aeronautics and Space Administration, Washington, D.C.

[21] Appl. No.: 765,273

[22] Filed: Sep. 25, 1991

[51] Int. Cl.⁵ .................... F28D 15/00; F28F 13/18; F28F 5/00
[52] U.S. Cl. .......................................... 165/1; 165/41; 165/86; 165/904; 165/48.2; 136/245; 136/246; 136/292; 244/158 R; 244/163; 244/173; 62/467; 62/DIG. 2
[58] Field of Search ................ 165/41, 86, 904, 1, 165/48.2; 62/467, 260, DIG. 2; 136/245, 246, 292; 244/158 R, 163, 173

[56] References Cited

U.S. PATENT DOCUMENTS

| | | | |
|---|---|---|---|
| 3,310,102 | 3/1967 | Trombe | 165/133 |
| 3,422,636 | 1/1969 | Fuschillo et al. | 62/467 |
| 3,422,886 | 1/1969 | Buller | 62/467 |
| 3,627,585 | 12/1971 | Dollery | 136/245 |
| 4,024,852 | 5/1977 | L'Esperance et al. | 136/246 |
| 4,071,017 | 1/1978 | Russell, Jr. et al. | 136/246 |
| 4,134,387 | 1/1979 | Tornstrom | 136/246 |
| 4,282,394 | 8/1981 | Lackey et al. | 136/245 |
| 4,412,430 | 11/1983 | Leroy | 62/467 R |
| 4,494,529 | 1/1985 | Lew | 136/246 |
| 4,586,350 | 5/1986 | Berdahl | 62/467 |
| 4,604,494 | 8/1986 | Shepard, Jr. | 136/246 |
| 4,624,113 | 11/1986 | Hull et al. | 62/467 |
| 4,630,791 | 12/1986 | Chapman | 244/173 |
| 4,690,355 | 9/1987 | Hornung et al. | 136/245 |
| 4,892,593 | 1/1990 | Lew | 136/246 |

FOREIGN PATENT DOCUMENTS

| | | | |
|---|---|---|---|
| 3205439 | 8/1983 | Fed. Rep. of Germany | 136/246 |
| 0298733 | 12/1990 | Japan | 165/904 |

Primary Examiner—John K. Ford
Attorney, Agent, or Firm—Hardie R. Barr; John R. Manning; Edward K. Fein

[57] ABSTRACT

An apparatus for rejecting waste heat from a system located on or near the lunar equator which utilizes a reflective catenary shaped trough deployed about a vertical radiator to shade the radiator from heat (i.e., infrared radiation) emitted by the hot lunar surface. The catenary shaped trough is constructed from a film material and is aligned relative to the sun so that incoming solar energy is focused to a line just above the vertical radiator and thereby isolate the radiator from the effects of direct sunlight.

The film is in a collapsed position between side by side support rods, all of which are in a transport case. To deploy the film and support rods, a set of parallel tracks running perpendicular to length of the support rods are extended out from the transport case. After the support tracks are deployed, the support rods are positioned equidistant from each other along the length of the support tracks so that the flexible film shade between adjacent support rods is unfolded and hangs in a catenary shaped trough. A heat radiator is supported between each pair of support rods above each hanging reflective trough. The system can also be equipped with a solar collector means at the focal line which can generate electricity or operate a Stirling cycle power plant.

9 Claims, 1 Drawing Sheet

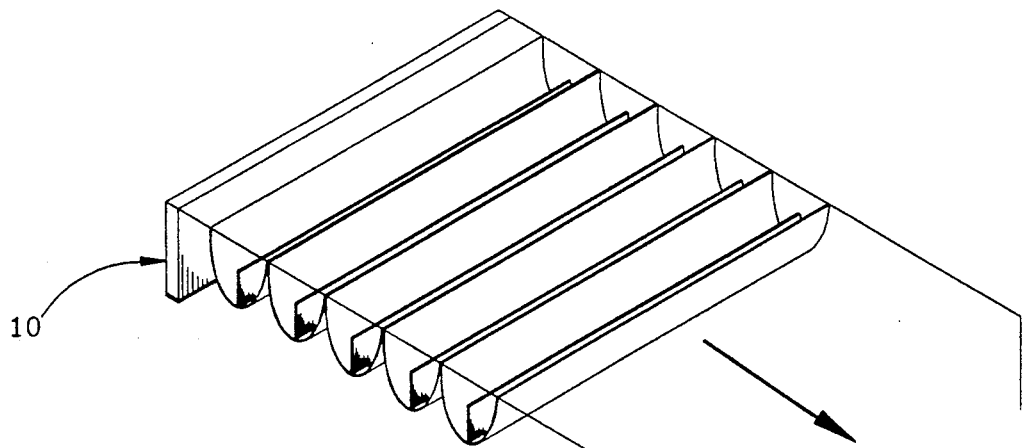
FIG. 1
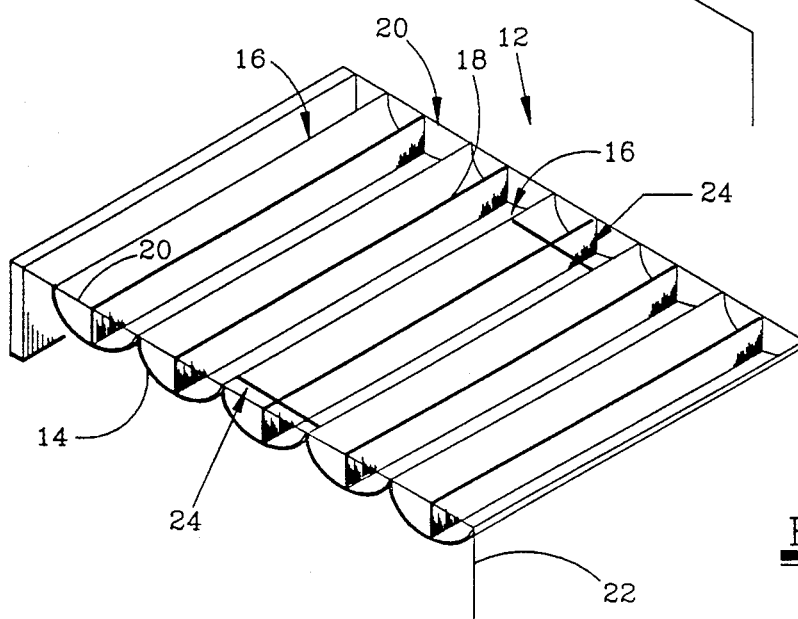
FIG. 2
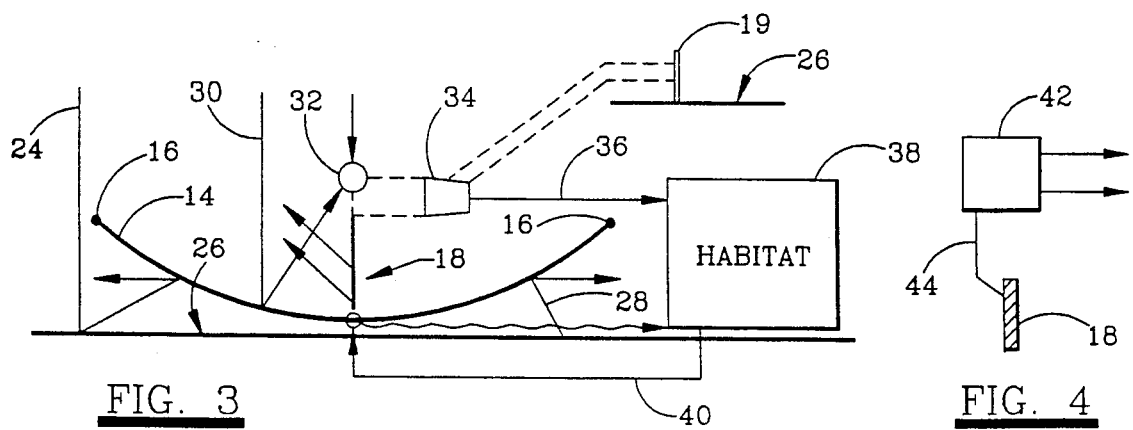
FIG. 3
FIG. 4

LUNAR RADIATOR SHADE

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates generally to a system for rejecting heat in a lunar environment and more particularly to a passive device for rejecting habitat waste heat at a location on or near the lunar equator utilizing a reflective flexible structure which is in a compact form for space travel and which can be deployed on the lunar surface.

2. Background Art

For aerospace applications, thermal or heat management is crucial to life support. The purpose of this invention is to provide a means of dissipating waste heat under certain limited conditions on the lunar surface.

In a lunar system, it is expected that the thermal environment at the lunar equator, and at latitudes up to about 50°, will require a system to decrease the ambient heat sink temperature or increase the waste heat temperature in order to increase the thermal operating efficiency of thermal control systems In the vacuum of space, such a system must reject by thermal radiation the waste heat collected from a crew and from electrical equipment.

Because of the space environment, the surface temperature near the lunar equator ranges from 102° K. at night to a peak of 384° K. during the day. With this hot lunar environment, dissipation or heat rejection of thermal radiation becomes a problem when the heat sink temperature exceeds the temperature of the heat to be dissipated. "Heat sink temperature" is the temperature to which the heat can be transferred by radiation, and must be less than the source temperature. As the heat sink temperature is reduced more and more below the source temperature, the efficiency of heat transfer increases. In a lunar environment, the heat sink temperature at solar noon for a typical vertical unshaded radiator at the equator is 322° K.

There are basically two ways this problem of the hot lunar environment can be solved. One way is to use an electrically or thermally powered heat pump to elevate the heat source temperature. Alternately a thermal radiation shading device can be employed to shield the radiator from the hot environment. Since heat pumps require a great deal of electrical or thermal energy to operate, a passive radiator shade device is desirable to shield the radiator from the hot environment and to reduce the effective heat sink temperature of the radiator. Radiator shade devices require little or no power and have no working parts once set up. However, they are typically large and cumbersome to set up.

Pertinent Prior Art includes the following:

U.S. Pat. No. 3,310,102 to Trombe.

U.S. Pat. No. 4,624,113 to Hull et al.

U.S. Pat. No. 4,624,113 to Hull et al. disclosed a radiative cooling system having a radiating surface aimed at the sky by a housing of compound parabolic aluminum mirrors. The radiating surface is surrounded by a transparent cover which is thermally isolated from the radiating surface by a vacuum.

U.S. Pat. No. 3,310,102 to Trombe discloses a radiator cooling system having an infrared radiating body, an opaque envelope surrounding the radiator (for thermally insulating the radiator), and a reflective lining (such as non-oxidized aluminum which reflects 99% of infrared radiation) disposed within the envelope. The reflective lining is shaped to reflect the radiations emitted by the radiator into space. In one embodiment, the reflective lining has a cylindroparabolic shape. The exterior of the envelope is coated with a substance capable of reflecting sun rays.

SUMMARY OF THE PRESENT INVENTION

The present invention involves an apparatus for rejecting waste heat from a system located on or near the lunar equator (± about 30° latitude). The apparatus comprises a reflective catenary shaped trough deployed about a vertical radiator to shade the radiator from heat (i.e., infrared radiation) emitted by the hot lunar surface. The radiator is located at the bottom of the catenary shaped trough and is aligned relative to the sun so that incoming solar energy is focused by the trough to a line located just above the vertical radiator thereby isolating the radiator from the radiation effects of direct sunlight.

More specifically, the catenary trough is formed from a flexible film material made of reinforced 3 mil thick aluminized polyimide film. The film is hung between parallel support rods and naturally hangs between the support rods to form catenary shaped troughs for each radiator. The catenary shape is very close to a parabolic configuration for the purposes of the present invention.

An array of the film troughs and radiators is formed from a collapsible support structure where the film is in a collapsed position between side by side support rods, all of which are in a transport case. To deploy the film and support rods, a set of parallel tracks running perpendicular to length of the support rods are extended out from the transport case. After the support tracks are deployed, the support rods are positioned equidistant from each other along the length of the support tracks tract so that the flexible film shade between adjacent support rods is unfolded and hangs in a catenary shaped trough. A heat radiator is supported between each pair of support rods above each hanging reflective trough.

DESCRIPTION OF THE DRAWINGS

FIG. 1 is a perspective view of a partially deployed flexible shade of the present invention;

FIG. 2 is a perspective view of a fully deployed flexible shade of the present invention; and FIG. 3 is a schematic illustration of a special application of the present invention.

DESCRIPTION OF THE INVENTION

Referring now to the drawings, the present invention contemplates a lightweight compact radiator and a heat shading system which is collapsed for space travel and minimizes the space and weight requirements for space travel. The collapsed shade system is deployable on the lunar surface to an extended shade system in which heat radiators allow radiation of 275° K. to 300° K. life support waste heat to the environment without a heat pump. The system may also provide a solar heat collector.

Referring now to FIG. 1, in the present invention the flexible radiator shade system includes an elongated rectangularly shaped container or transport case 10 for housing the system during space travel. A fully deployed shade system 12 is shown in FIG. 2. A shade trough 14 consists of a strip of flexible sheet material such as a three mil thick reinforced, aluminized polyimide film. When the film material is fully deployed as shown in FIG. 2, a series of catenary shaped troughs are defined between spaced apart, parallel arranged support rods 16. A radiator element 18 is vertically disposed in each catenary trough of the flexible sheet material.

In transport to the moon, the multiple side by side portions of flexible sheet material which form the catenary shaped troughs are pushed together or collapsed so that adjacent radiator elements 18 and support rods 16 are touching and the flexible sheet material is between the radiator elements 18 in a stowed position in the transport case 10.

To deploy the radiator system, elongated and parallel support track members 20 are extended from the transport case 10. Vertical support legs 22, as necessary, are located along the length of the track members 20. This may be done by extravehicular activity of the astronauts. The shade support rods 16 which connect to adjacent sections of the film material are attached in position along the support track members 20. Thin wires 24 are extended between the tops of the radiator elements 18 and the support rods 16 to assure proper spacing and location.

The size of each radiator element 18 is a matter of choice but the length must be much greater than the height to overcome end effects. An example of the system is herein provided and has been modeled for a vertical radiator, a catenary shading device, the lunar surface and space. Surfaces are assumed to have no thermal mass and linear conduction between surfaces is ignored. With a two sided radiator 1 m high and 100 m long, the radiator is divided into 8 nodes per side, all at 270° K. The radiator surface properties are solar absorptivity ($\alpha$) of 0.23 and infrared emissivity (E) of 0.9. The radiator is in an aligned position parallel to the lunar equator with sunlight striking the radiator at an angle of 1.53°. The catenary shade which runs the entire length of the radiator can be modeled as a series of thin rectangular sections and the catenary cross section is approximated by 14 straight segments. Each segment contains four nodes which are active on both sides. The inside of the shade is a highly reflective surface ($\alpha = 0.14$, $E = 0.05$) while the outside surface is relatively black ($\alpha = 0.9$; $E = 0.9$). The lunar surface is considered to be a large rectangular plane (500 m by 400 m) broken into 5 rectangular nodes with surface properties of $\alpha = 0.93$ and $E = 0.93$.

Using an aluminized polyimide film, the total reflectivities are 0.86 and 0.95 for the solar and the infrared (IR) spectrums respectively. For the baseline case, the solar reflectivity is assumed 100% specular and the IR reflectivity is 100% diffuse. The shape of the catenary shade is arranged to yield a focal point of 1 meter (the top of the radiator). At solar noon the radiator effective heat sink temperature is 205.5° K. compared to an unshaded sink temperature of 322° K. The temperature of the shade reaches 380° K. however, due to its low emissivity, it does not heat the radiator nearly as much as the lunar surface would.

It is desirable to find a shade material with the lowest possible values of $\alpha$ and E because the sink temperatures vary as a function of $\alpha$ and E.

Alignment of the lunar radiator parallel to the equator for alignment of the edge to sun throughout the lunar day can be within a 10° angle without a significant effect on the radiator sink temperature. The focal point of the shade can be increased or raised but will also increase the dimensional size of the shade.

Based upon the foregoing model a radiator unit can be 1 m (3.3 feet) high by 10 m (32.8 feet) long. End shields can be used, if desired, to reduce undesirable heating through the open ends of the parabolic trough.

It has been determined that a 10 m long unit with end shields as described above will reject 4.2 KW of life support waste heat at a radiator root temperature of 285° K. (53° F.) and a fin efficiency of 0.9. If the optical properties of the shade are $\alpha = 0.1$ and $E = 0.02$, rejection will increase to 4.4 KW.

By way of background explanation, the primary factors affecting the thermal environment on the moon are a 29.5 earth-day light/dark cycle, a relatively high solar flux and the lack of an atmosphere. The angle at which the sun's ray strike the lunar surface at noon varies by ±1.53° over time due to the inclination of the lunar equator to the eliptic.

Thus, in the present invention, at the lunar equator the vertical radiators are aligned with the equator. Therefore the maximum angle of incidence of sunlight is 1.53° relative to the radiator plane.

The maximum solar flux at the lunar surface is 1371 $W/M^2$ and the average albedo is 0.07. Since there is no atmosphere, the surface temperature near the equator ranges from 102° K. at night to a peak 384° K. during the day.

Referring now to FIG. 3, a catenary shade trough 14 for a radiator element 18 will deflect the albedo radiation (see line 24) from the ground surface and planetary radiation (see line 28) while the incident solar radiation (see line 30) can be focused to a line above the top of the radiator.

FIG. 3 shows a special application of the invention in which the focused solar energy of the parabolic shade is used to power an engine to produce electricity.

In studying the design parameters for the system, a two sided radiator 18 with dimensions of 1 m high by 10 m length was chosen. The 10 $m^2$ radiator can reject 3.7 KW of life support waste heat at 285° K. The shade trough 14 has a catenary shape when deployed. The parallel support rods 16 are spaced 4.6 m from one another. A tubular solar collector 32 is horizontally located 0.33 m above and parallel to the top of the radiator 18 at the focal line of the catenary shade trough 14. Electric power is generated by a free piston Stirling engine 34 operating between 900° K. and 550° K. at an efficiency of 16.7%. Assuming an overall solar collector efficiency of 35%, 22 KW of heat is absorbed at noon. Of the 22 KW of energy collected, 3.7 KW is converted to electricity and supplied (see arrow 36) to the habitat 38 and 18.4 KW is rejected through a separate power cycle radiator 19 also located on the ground surface 26 at 550° K. Most of the 3.8 KW of electricity supplied to the habitat 38 is returned by a heat conduit 40 as low grade waste heat by the life support thermal control system and is rejected through the shaded low temperature radiator 18 at an average temperature of 285° K. The power cycle waste heat is rejected through the radiator 19 at 550° K.

The above system can be adjusted by different temperatures of the power cycle and the sizing of the radiators 18,19.

In another aspect of the invention the solar collector 32 can be used to provice process heat if desired. In preference to the collector 32, a strip of thermoelectric or photovoltaic (PV) cells 42 (FIG. 4) can be placed above the radiator to intercept the focused solar energy. A thermal tie 44 to the radiator 18 is used to provide a cold junction for the thermoelectric cells.

In the present invention, the flexible shade design solves a large stowed volume problem in space transport. It is lightweight and easy to deploy. A 100 KW heat rejection system operating at 285° K. (53° F.) would weigh 2467 kg compared to 4036 kg for a vapor compression heat pump system.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A radiator shade for passively reducing the heat sink temperature for a radiator device comprising:
   a strip of flexible film material having a reflective side and a non-reflective side;
   elongated horizontal support means in an extended relationship being disposed parallel to one another and with an equal spacing relationship along the length of said strip for positioning at locations along the side edges of said strip and means for elevating said horizontal support means above a ground surface so that the horizontal support means can be separated from one another in a horizontal plane to drape the film material in catenary shaped troughs between adjacent horizontal support means and where such catenary shaped troughs have the reflective surface facing away from said ground surfaces with said reflective surface horizontal support means arrangeable to focus radiant energy rays to a focal line located above the elevation of the vertical support means;
   radiator means vertically disposable in each of said catenary shaped troughs at locations below said focal line; and
   said horizontal support means being movable between a collapsed side by side relationship for transportation purposes and said extended relationship for functional purposes.

2. The apparatus as set forth in claim 1 wherein the length of said radiator means has a lengthwise dimension greater than its vertical dimension.

3. The apparatus as set forth in claim 2 wherein said radiator means is two sided.

4. The apparatus as set forth in claim 1 and further including a solar collector means disposed along said focal line for collecting heat.

5. The apparatus as set forth in claim 4 wherein said collector means is for converting heat into electricity.

6. The apparatus as set forth in claim 4 wherein said collector means is coupled to engine means for converting heat into electricity.

7. The apparatus as set forth in claim 6 wherein said radiator means comprises a separate power radiator and a separate low temperature radiator, said high temperature radiator being coupled to said engine means for dissipating heat,
   and further includes habitat means for receiving electricity and wherein waste heat can be generated, and
   means for conveying such waste heat to said low temperature radiator, 8. A method of heat dissipation for a lunar environment at the vicinity of the lunar equator with a radiator shade array movable between a collapsed relationship and an extended relationship where the radiator shade is a flexible strip of material with a reflective surface and a non-reflective surface and is attached to lengthwise extending horizontal members which are longitudinally spaced from one another and radiator elements are disposed between adjacent horizontal members;
   moving the horizontal members to horizontal spaced apart locations relative to a horizontal ground surface and supporting said horizontal members above the ground surface so that the strip of material between adjacent horizontal members has its reflective surface defining a catenary trough with a focus at a focal line above the horizontal members;
   fixing the radiator elements in vertical planes relative to said horizontal members; and
   aligning the radiator elements parallel to the lunar equator and at an angle of incidence relative to solar radiation to minimize direct incidence of sunlight on the radiator elements.

9. The method as set forth in claim 8 wherein the angle of incidence is 0° plus or minus 10°.

* * * * *